United States Patent [19]

Hann et al.

[11] Patent Number: 5,365,132
[45] Date of Patent: Nov. 15, 1994

[54] LAMINATION FOR A DYNAMOELECTRIC MACHINE WITH IMPROVED COOLING CAPACITY

[75] Inventors: John C. Hann; Harald E. Blaettner, both of Fort Wayne, Ind.

[73] Assignee: General Electric Company, Fort Wayne, Ind.

[21] Appl. No.: 68,208

[22] Filed: May 27, 1993

[51] Int. Cl.⁵ .................... H02K 1/20; H02K 9/00
[52] U.S. Cl. ................................. 310/58; 310/54
[58] Field of Search .................. 310/52, 58, 59, 64, 310/65, 60 R, 60 A, 216, 254, 258

[56] References Cited

U.S. PATENT DOCUMENTS

| | | | |
|---|---|---|---|
| 957,103 | 5/1910 | Roos | 310/64 |
| 1,261,126 | 2/1918 | Hellmund | 310/58 |
| 1,329,247 | 1/1920 | Kuyser | 310/64 |
| 1,448,700 | 3/1923 | Seidner | 310/54 |
| 1,656,421 | 1/1928 | Clarke | 310/54 |
| 1,959,527 | 5/1934 | Ehrmann | 310/54 |
| 2,438,872 | 3/1948 | Fuge | 171/252 |
| 2,700,115 | 1/1955 | Mowery, Jr. | 310/57 |
| 2,895,065 | 7/1959 | Rosenberg | 310/64 |
| 3,142,772 | 7/1964 | Jones | 310/62 |
| 3,146,605 | 9/1964 | Rachfal et al. | 62/197 |
| 3,488,532 | 1/1970 | Endress et al. | 310/58 |
| 3,621,315 | 11/1971 | Dalmo et al. | 310/183 |
| 3,675,056 | 7/1972 | Lenz | 310/54 |
| 3,684,906 | 8/1972 | Lenz | 310/64 |
| 3,727,085 | 4/1973 | Goetz et al. | 310/54 |
| 4,365,178 | 12/1982 | Lenz | 310/61 |
| 4,406,959 | 9/1983 | Harano et al. | 310/58 |
| 4,456,845 | 6/1984 | Cunningham | 310/90 |
| 4,912,350 | 3/1990 | Parshall et al. | 310/217 |
| 4,994,700 | 2/1991 | Bansal et al. | 310/215 |
| 5,084,642 | 1/1992 | Katsuzawa et al. | 310/54 |
| 5,087,849 | 2/1992 | Neuenschwander | 310/216 |

FOREIGN PATENT DOCUMENTS

| | | | |
|---|---|---|---|
| 659874 | 6/1965 | Belgium | 310/59 |
| 0029502 | 3/1978 | Japan | 310/58 |
| 0257736 | 12/1985 | Japan | 310/59 |
| 637913 | 12/1978 | U.S.S.R. | |
| 1310950 | 5/1987 | U.S.S.R. | |
| 1372500 | 7/1988 | U.S.S.R. | |
| 1480023 | 5/1989 | U.S.S.R. | 310/59 |

Primary Examiner—Kristine L. Peckman
Assistant Examiner—C. LaBalle
Attorney, Agent, or Firm—Ralph E. Krisher, Jr.

[57] ABSTRACT

An improved cooling arrangement for a dynamoelectric machine of the type having a plurality of stacked laminations forming a stator core. The stacked laminations have a central bore for passage of a rotor therethrough and a plurality of uniformly spaced winding slots extending radially outward from the bore and terminating at an end at least partially through the laminations. Adjacent ones of the slots define pole pieces extending from the bore into a radially outer portion of the laminations. The improvement comprises a plurality of cooling air passages extending axially through the stacked laminations generally parallel to the central bore with each of the air passages being positioned adjacent the terminating end of a corresponding one of the winding slots. Each air passage has a radially outer shape corresponding generally to a radially outer shape of the winding slots and preferably have a crescent shape when viewed axially.

14 Claims, 3 Drawing Sheets

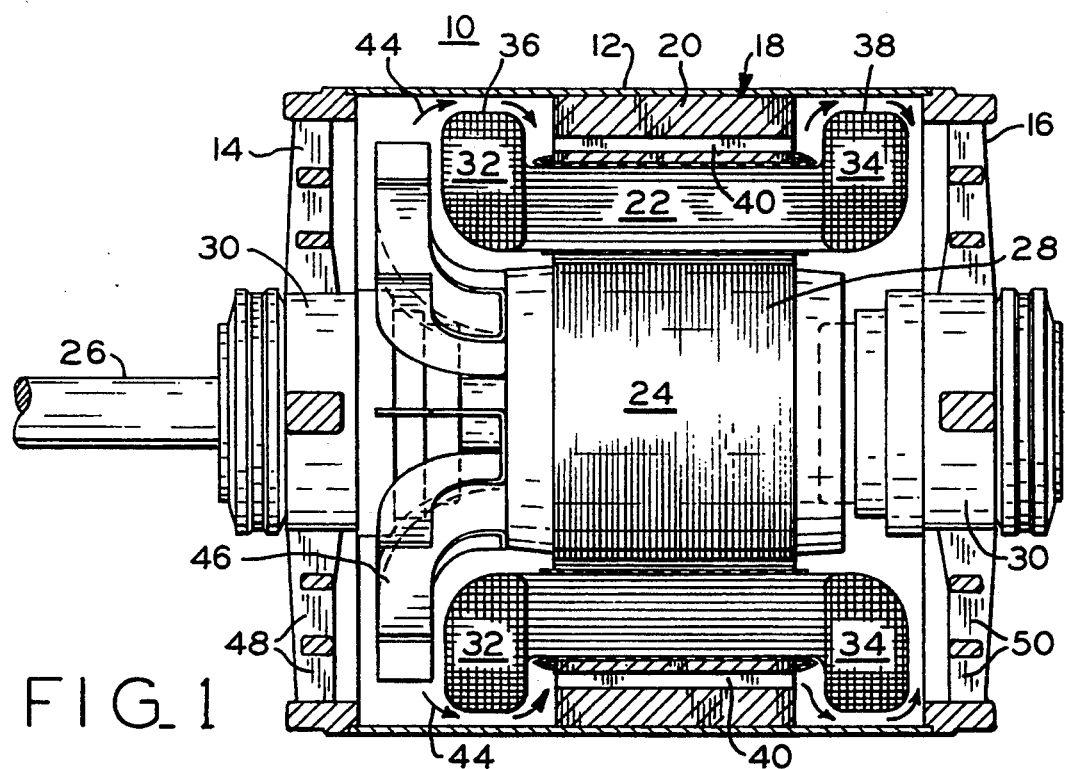
FIG_1
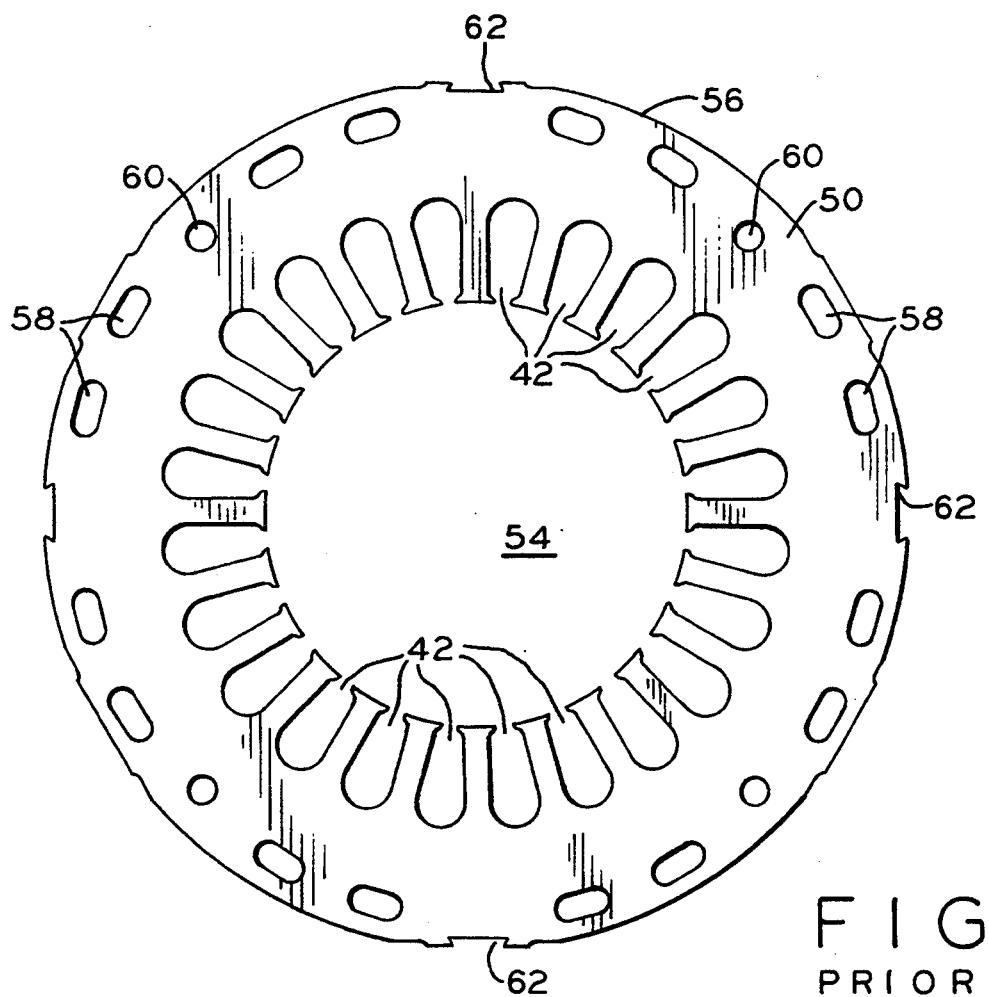
FIG_2
PRIOR ART

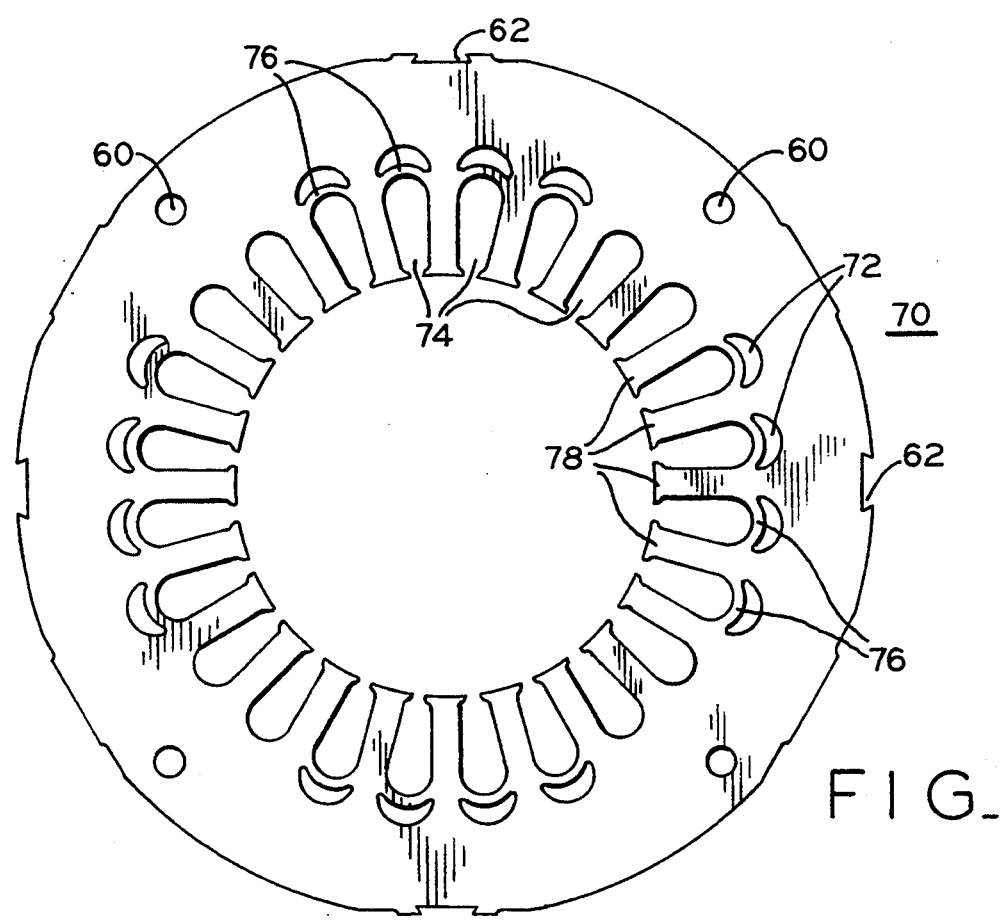
FIG_3
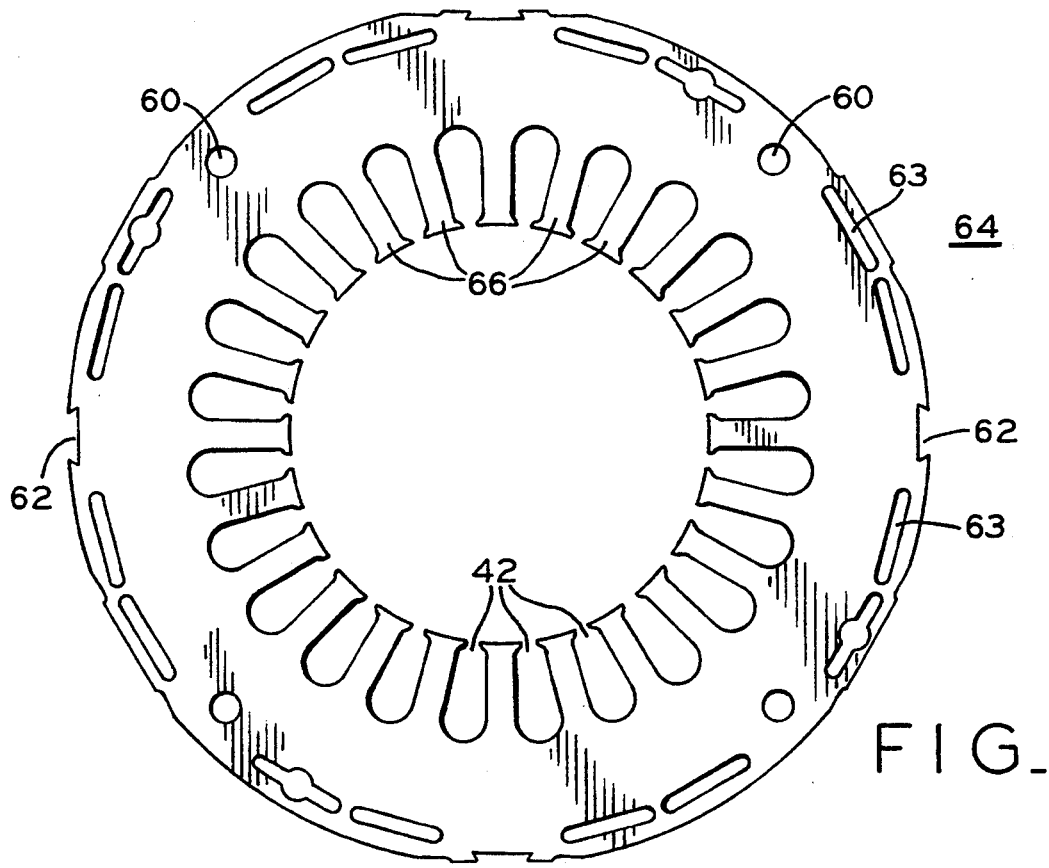
FIG_4

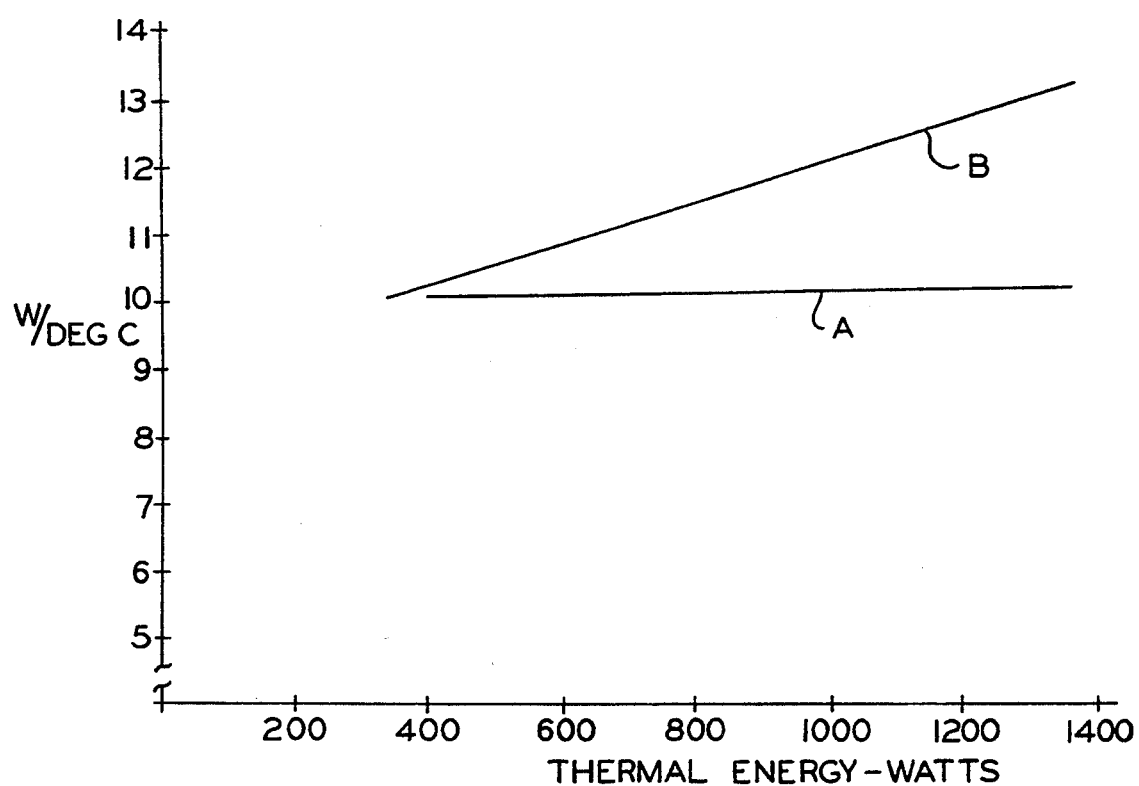
FIG_5

LAMINATION FOR A DYNAMOELECTRIC MACHINE WITH IMPROVED COOLING CAPACITY

BACKGROUND OF THE INVENTION

The present invention relates to dynamoelectric machines and, more particularly, to a stator lamination and stator cooling arrangement for such machines.

Dynamoelectric machines such as rotary electric motors are generally provided with some form of cooling in order to extend the operating capability of the machines. In general, it is desirable to maintain the temperature of such machines below a predetermined limit in order to prevent deterioration of the machine through thermal breakdown of insulation or thermal distortion due to thermal expansion of elements of the machine. In air cooled dynamoelectric machines, air is forced through air passages in the stator core as well as along surfaces of the rotor and adjacent windings in the machine. The air may be forced by external means but is generally drawn in through apertures or vents in the end bell or caps by a fan coupled in driving relationship with a rotating assembly and rotor of the machine. Air passages are formed in the stator core for passage of this cooling air so as to carry heat from the machine. In general, the stator core air passages are formed as round or oval passages adjacent the outer periphery of the stator core.

As increased horsepower has been demanded from such dynamoelectric machines while the physical size has been maintained or, in some instances, reduced, there has been a concurrent requirement to provide more efficient cooling of the machines. Such demand and requirement have necessitated development of improved cooling without impacting electromagnetic design of such machines.

SUMMARY OF THE INVENTION

Among the several objects of the present invention may be noted the provision of an improved cooling arrangement for a dynamoelectric machine which is achieved without detrimental effect on the electromagnetic design of the machine. In one form, the improvement is illustrated in an electric motor of the 1-5 horsepower class in which the stator assembly thereof is formed from a plurality of stack laminations, the available horsepower being determined by the stack height. The stator lamination comprises a generally flat disk having a centrally located bore for passage of a rotor therethrough. A plurality of uniformly spaced winding slots extend radially outward from the bore with adjacent ones of the winding slots defining a pole piece extending from the bore to a radially outer portion of the lamination. A plurality of cooling air passages are formed in the lamination adjacent a radially outer termination of at least some of the winding slots. Preferably, the passages having a radially inner boundary conforming generally to the radially outer termination of the winding slots and a radially outer boundary arcuately shaped for minimizing effects on the electromagnetic flux path extending radially through the pole pieces. More particularly, the passages have a generally crescent shaped configuration.

In an illustrative embodiment, the invention is disclosed as an improved cooling arrangement for a dynamoelectric machine of the type having a plurality of stacked laminations forming a stator core. The stacked laminations have a central bore for passage of a rotor therethrough and a plurality of uniformly spaced winding slots extending radially outward from the bore and terminating at an end at least partially through the laminations. Adjacent ones of the slots define pole pieces extending from the bore into a radially outer portion of the laminations. A plurality of cooling air passages extend axially through the stacked laminations generally parallel to the central bore. Each of the air passages are positioned adjacent the terminating end of a corresponding one of the winding slots and each air passage has a radially outer shape corresponding generally to a radially outer shape of the winding slots. Preferably, each cooling air passage extends circumferentially between a pair of radius lines of the machine co-extensive with opposite circumferential edges of a respective one of the winding slots and each air passage has a crescent shape when viewed axially. Each said air passage is also positioned to minimize effects on electromagnetic flux lines in the stacked laminations.

The invention is further disclosed in a dynamoelectric machine having an outer housing and a pair of end shields attached to opposite ends of the housing with each of the end shields having a plurality of air vents passing therethrough. A stator assembly is positioned in the housing generally axially spaced from the end shields and has a plurality of windings adapted for excitation upon the energization of the dynamoelectric machine. The stator assembly comprises a plurality of stacked laminations having a plurality of axially aligned, circumferentially spaced, radially inner slots through which the winding means extend. A plurality of crescent shaped air passages are positioned adjacent a radially outer end of at least some of the slots and a blower is provided for forcing cooling air through the air passages for cooling the windings. The stator assembly is assembled in heat exchange relationship with the outer housing and the air passages are positioned such that a major portion of the mass of the stacked laminations lies outside a cylinder defined by an outer periphery of the air passages. The windings include a pair of opposite end turns, each of which are formed with radially outwarding extending portions. The air passages positioned adjacent the winding slots causes the air to blow into and over the end turns to improve heat transfer from the end turns to the air. In one form, the dynamoelectric machine stator assembly has an outer diameter of about 6.4 inches and the cross-sectional area of each of the air passages is about 0.0475 square inches.

BRIEF DESCRIPTION OF THE DRAWINGS

For a better understanding of the present invention, reference may be had to the following detailed description taken in conjunction with the accompanying drawings in which:

FIG. 1 is a simplified cross-sectional view of a dynamoelectric machine incorporating the improved cooling arrangement of the present invention;

FIG. 2 is a plan view of a prior art stator lamination for use in a dynamoelectric machine;

FIG. 3 is a plan view of a stator lamination in accordance with one form of the present invention;

FIG. 4 is a plan view of a stator lamination of another embodiment; and

FIG. 5 is a graph comparing the heat transfer characteristics of the present invention to the prior art.

DETAILED DESCRIPTION OF THE INVENTION

Referring now to the drawings in general, and in particular to FIG. 1, there is shown a cross-sectional view of a dynamoelectric machine 10 incorporating the teachings of the present invention. The dynamoelectric machine 10 includes an outer housing 12 and a pair of opposite end shields 14 and 16. The machine 10, which may be operated as a generator but is preferably operated as an electric motor, includes a stator assembly 18 preferably formed of a plurality of stacked ferromagnetic laminations 20. The stacked laminations 20 are generally circumferentially encompassed by outer housing or shell 12 of dynamoelectric machine 10 and predeterminately spaced between the opposite end shields 14 and 16. The laminations 20 are also desirably fitted within housing 12 so as to be in heat exchange relationship with the housing. The stator assembly further includes a plurality of winding means, indicated generally at 22, which are adapted for excitation upon the energization of the dynamoelectric machine across a power source (not shown). A rotatable assembly, indicated generally at 24, comprises a shaft 26 having a squirrel cage rotor 28 or the like for instance mounted thereon so as to be conjointly rotated with the shaft. However, it is contemplated that rotors other than the squirrel cage type may be utilized with the shaft 26 of the rotatable assembly. The rotor 28 of the rotatable assembly 24 is arranged or otherwise associated in magnetic coupling relation with stator assembly 18 upon the energization of dynamoelectric machine 10, and means, such as bearing device 30 or the like for instance, is associated with each end shield 14 and 16 and adjustably alignable for journaling a part such as shaft 26 of the rotatable assembly.

The winding means include a pair of opposite end turns 32, 34 which are formed so as to be disposed in a radially outwardly directed orientation with a close spacing between radially outer boundaries 36, 38, respectively, of the end turns and the outer housing 12. A plurality of air passages 40 are formed through the stacked laminations 20 of the stator assembly 18 for passage of cooling air therethrough. The stator assembly 18 further includes a plurality of radially inner circumferentially spaced and axially extending slots 42, shown in FIGS. 2-4, within which the stator winding means 22 is disposed. The air passages 40 are positioned so as to be adjacent at least some of the slots 42 such that air passing through the slots affects a cooling of the adjacent stator structure and the associated winding means 22. The arrows 44 indicate the flow of air through the air passages 40 and around the outwardly extending end turns 32, 34 of the winding means 22. The cooling air is forced through the stator assembly 18 by means of a blower means 46 or similar type fan arrangement connected in rotating relationship with the motor shaft 26 whereby rotation of the rotor assembly 24 affects conjoint rotation of the fan or blower means 46. The air is drawn into the dynamoelectric machine or motor through air vents 48 circumferentially spaced about the end shields 14 and blown through the stator assembly 18 exiting through air vents 50 in the opposite end shield 16.

It will be noted that the air passages 40 through the stator assembly are positioned adjacent and very near to the winding means 22. A large extent of the mass of the laminations of the stator assembly 18 is located between the air passages 40 and the outer housing 12. The position of the air passages 40 is selected so as to minimize their effect on magnetic flux within the laminations 20 of the stator assembly 18 and further to provide a maximum heat transfer between the major mass portion of the stator laminations 20 and the outer housing 12. Concurrently, the end turns 32, 34 are formed to arch radially outward toward the outer shell 12 so as to force the flow of cooling air through a path over and around the end turns thereby to affect a better transfer of heat from the winding end turns to the cooling air.

To better explain the present invention, reference is now made to FIG. 2 which illustrates an exemplary prior art stator lamination 50 for a dynamoelectric machine such as that shown in FIG. 1. The lamination 50 includes a plurality of circumferentially spaced, radially inner winding slots 42 through which selected ones of the windings of the winding means 22 pass. The slots 42 circumscribe a central aperture 54 which receives the rotor 28 of the rotatable assembly 24. Adjacent an outer perimeter 56 of lamination 50 there are positioned a plurality of elongated air passages 58 for passage of cooling air through the stacked laminations 20 of an assembled stator as described generally with respect to FIG. 1. Lamination 50 also includes apertures 60 for passage therethrough of fasteners, such as an elongated bolt (not shown), which may be used in the assembly of the dynamoelectric machine. Slots 62 along the perimeter of lamination 50 are used to align the stacked laminations 20 of the stator assembly.

During operation of the dynamoelectric machine 10, electric current energizing the winding means 22 results in heating of the winding means due to the inherent resistance of the winding means. The amount of electric power dissipated in the winding means 22 is a function of the value of current I and the winding resistance R, i.e., power dissipated is proportional to $I^2R$, where I is the magnitude of current supplied to the winding means. As the horsepower requirements for the machine 10 are increased, the power dissipated in the form of heat increases as a square of the current. Such increased heat can result in insulation breakdown and thermal distortion of the machine and result in failure.

Cooling air forced through passage 58 picks up heat energy from the lamination 50 and carries the heat to outside the machine 10 thus extending the power capability of the machine. It will be seen in FIG. 2 that the heat energy transfers from the winding means 22 to the stator lamination 50, passing through the primary mass of the lamination before reaching the passages 58. Although the electromagnetic material of the lamination 50 is a relatively weak heat conductor, cooling air adjacent the perimeter of the lamination is effective in cooling of the winding means 22 by transference of heat energy from the Winding means to the lamination and then to the cooling air in passages 58. However, as electric power is increased to the machine 10, a limit is reached at which the cooling air cannot keep the winding temperature below a critical value.

One method of improving heat transfer is to increase the cross-sectional area of the air passages 58 so as to expose more surface to the flow of cooling air. FIG. 4 illustrates one such method in which the air passages 58 are redesigned into stretched or further elongated passages 63 in a lamination 64 thereby increasing the surface area exposed to cooling air. The stretched passages 63 have proven to be more effective, as will be shown hereinafter, than the passages 58. However, one disadvantage of the passages 63 is that they tend to block heat flow from the laminations 64 to the outer housing or shell 12 of the machine 10. Accordingly, the stretched passages 63 reduce the amount of heat which has heretofore been transferred to the outside environment via the housing 12.

One possible modification of the lamination 64 is to move the air passages 63 from adjacent the outer periphery to a position closer to the winding slots 52. However, moving the passages 63 radially inward will place them in a location which will detrimentally interfere with electromagnetic flux in the lamination. More particularly, the winding means 22 establishes electromagnetic flux in the stator lamination with the flux path extending radially outward into the major mass portion of the lamination, i.e., that portion between the slots 52 and the outer shell 12, and further extending through the teeth 66 between the slots 52. The flux projected radially inward from the teeth 66 define the magnetic poles of the stator assembly which affect rotation of the rotatable assembly 24. Blockage of the flux path detrimentally affects the magnetic pole strength and the power capability of the machine 10.

Applicants have discovered that improved cooling capability can be achieved by redesigning the lamination air passages such that they can be moved to a position adjacent the lamination slots without detrimentally interfering with the stator electromagnetic flux paths. Referring to FIG. 3, there is shown a stator lamination 70 in accordance with the teaching of the present invention in which a plurality of cooling air passages 72 are formed adjacent at least some of a plurality of radially inner stator winding slots 74. The slots 74 are formed with a conventional configuration, i.e., being slightly pie shaped with a somewhat wider radially outer portion. The air passages 72 are formed adjacent at least some of the slots 74, being separated from the slots by a relatively thin bridge 76. The passages 72 are formed with a crescent shape having a radially inner perimeter which conforms generally to the radially outer perimeter of an adjacent slot 74. A radially outer perimeter of passage 72 is formed as though it were an outer perimeter of the adjacent slot. By forming the passages 72 in this manner, the passages do not extend into the magnetic flux path defined between the slots 74 by intermediate teeth 78.

Tables 1, 2 and 3 compare the effectiveness of the air passages 58, 62 and 72, respectively, in a dynamoelectric machine or motor having stator laminations of about six inches in diameter and a rotor diameter of about three inches. Such motors are typically about from one to five horsepower where the horsepower can be increased by extending the lamination stack height and the length of the rotor. In the Tables, DH is hydraulic diameter (equal to four times cross-sectional area divided by perimeter), V is air velocity in feet per minute, H is a film coefficient, HA is the coefficient of heat transfer (i.e., H multiplied by A, the heat transfer surface area of the air passage) and CFM is the cubic feet per minute of cooling air.

TABLE 1

| CFM | DH | V | H | HA |
| --- | --- | --- | --- | --- |
| 0.1 | 0.02315 | 12100.8 | 1.8 | 0.01253 |
| 0.2 | 0.02315 | 24201.7 | 3.1 | 0.02182 |
| 0.3 | 0.02315 | 36302.5 | 4.2 | 0.03018 |
| 0.4 | 0.02315 | 48403.4 | 5.3 | 0.03799 |
| 0.5 | 0.02315 | 60504.2 | 6.4 | 0.04541 |
| 0.6 | 0.02315 | 72605.0 | 7.4 | 0.05254 |

TABLE 1-continued

| CFM | DH | V | H | HA |
| --- | --- | --- | --- | --- |
| 0.7 | 0.02315 | 84705.9 | 8.3 | 0.05944 |
| 0.8 | 0.02315 | 98806.7 | 9.3 | 0.06614 |
| 0.9 | 0.02315 | 108907.6 | 10.2 | 0.07267 |
| 1.0 | 0.02315 | 121008.4 | 11.1 | 0.07907 |

TABLE 2

| CFM | DH | V | H | HA |
| --- | --- | --- | --- | --- |
| 0.1 | 0.01493 | 12743.4 | 2.0 | 0.02100 |
| 0.2 | 0.01493 | 25486.7 | 3.5 | 0.03656 |
| 0.3 | 0.01493 | 38230.1 | 4.8 | 0.05057 |
| 0.4 | 0.01493 | 50973.5 | 6.1 | 0.06366 |
| 0.5 | 0.01493 | 63716.8 | 7.2 | 0.07610 |
| 0.6 | 0.01493 | 76460.2 | 8.4 | 0.08805 |
| 0.7 | 0.01493 | 89203.6 | 9.5 | 0.09961 |
| 0.8 | 0.01493 | 101946.9 | 10.5 | 0.11084 |
| 0.9 | 0.01493 | 114690.3 | 11.6 | 0.12179 |
| 1.0 | 0.01493 | 127433.6 | 12.6 | 0.13250 |

TABLE 3

| CFM | DH | V | H | HA |
| --- | --- | --- | --- | --- |
| 0.1 | 0.01530 | 18189.5 | 2.6 | 0.01899 |
| 0.2 | 0.01530 | 36379.0 | 4.6 | 0.03306 |
| 0.3 | 0.01530 | 54568.4 | 6.4 | 0.04573 |
| 0.4 | 0.01530 | 72757.9 | 8.0 | 0.05757 |
| 0.5 | 0.01530 | 90947.4 | 9.6 | 0.06882 |
| 0.6 | 0.01530 | 109136.9 | 11.1 | 0.07962 |
| 0.7 | 0.01530 | 127326.3 | 12.5 | 0.09008 |
| 0.8 | 0.01530 | 145515.8 | 13.9 | 0.10023 |
| 0.9 | 0.01530 | 163705.3 | 15.3 | 0.11013 |
| 1.0 | 0.01530 | 181894.8 | 16.7 | 0.11982 |

Table 1 illustrates the characteristics of the cooling air passages of FIG. 2 for an exemplary motor having air passages with a cross-sectional area of 0.0714 in$^2$ and a perimeter of 1.028 inches. Note that the values of HA are lowest for this configuration of air passage. Table 2 shows the effect of stretching the air passages such that the cross-sectional area decreases to 0.0678 in$^2$ but the perimeter increases to 1.514 inches as shown in the lamination 62 of FIG. 4. The configuration of FIG. 4 actually has the highest values of HA and is therefore more effective in heat transfer via the cooling air. However, the effect of blocking heat transfer to the shell 12 overcomes the other advantages.

Table 3 shows the improvement attained with the crescent shaped passages 72 of FIG. 3. The value of HA is improved by about fifty percent over the conventional passages of FIG. 2. Further, the reduction in HA as compared to FIG. 4 (Table 2) is relatively small and offset by improved heat transfer to the machine shell 12 since the outer air passages are eliminated. More importantly, magnetic saturation tests of a motor using the lamination of FIGS. 3 and 4 have shown virtually no difference when compared to the saturation curve for a similar motor using the prior art lamination of FIG. 2. Referring to FIG. 5, a graph of thermal dissipation capacity for identical motors, one using conventional air passages as in FIG. 2 (Line A) and another using crescent shaped air passages of FIG. 3 (Line B), shows significant improvement with the crescent shaped passages 72. The vertical axis of FIG. 5 measures heat dissipation in watts per degree Celsius while the horizontal axis measures dissipated losses in watts.

It will be appreciated that the crescent shaped air passages 72 are placed or formed as near to the slots 74 as practical. The bridge 80 separating the slots 74 from passages 72 must have sufficient strength to support the winding means 22 during the assembly thereof since the windings are forced downward to substantially fill the slots 74. In the exemplary motor lamination 70, the bridge 80 is about 0.0625 inches thick, i.e., the distance from slot 74 to passage 72. The cross-sectional area of the passages 72 is selected to maximize air flow without detrimentally affecting the electromagnetic structure or flux path in the lamination. More specifically, the total flux area is the distance from the lamination outer diameter to the outer perimeter of the air passage 72 times the stack length. While horsepower can be increased by increasing stack length, industry standards generally define motor diameter and thus limit the ability to increase flux area radially. Accordingly, the cooling requirements become a balance against desired flux and control the size of cooling air passage 72. The crescent shaped passage adjacent the winding slot improves cooling without adversely affecting power output.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A stator lamination for a dynamoelectric machine comprising:

a generally flat disk having a centrally located bore for passage of a rotor therethrough;

a plurality of uniformly spaced winding slots extending radially outward from said bore, each adjacent ones of said winding slots defining a pole piece extending from said bore to a radially outer portion of the lamination, at least some of said winding slots extending radially outward beyond others of said winding slots;

a relatively narrow bridge extending in a circumferential direction across each of said at least some of said winding slots, said bridge separating said winding slots into a radially inner winding receiving portion substantially dimensionally identical to said others of said winding slots and into a radially outer passage for passing a cooling fluid in close proximity to windings in said radially inner portion of said at least some of said winding slots; and a radially outer boundary of said passages arcuately shaped with respect to the lamination for minimizing effects on the electromagnetic flux path extending radially through said pole pieces.

2. The stator lamination of claim 1 wherein said passages have a generally crescent shaped configuration.

3. The stator lamination of claim 2 wherein said passages have a radial dimension approximately one-sixth of the radial dimension of said winding slots.

4. The stator lamination of claim 3 wherein said winding slots having a radial dimension approximately one-half of a radial dimension of the lamination extending from said bore to an outer perimeter of the lamination.

5. The stator lamination of claim 4 wherein the lamination comprises one lamina in a plurality of stacked laminations, said laminations being stacked such that said passages align to form axially extending passages through said stacked laminations.

6. An improved cooling arrangement for a dynamoelectric machine, of the type having a plurality of stacked laminations forming a stator core, the stacked laminations having a central bore for passage of a rotor therethrough and a plurality of uniformly spaced winding slots extending radially outward from the bore and terminating at an end at least partially through the laminations, adjacent ones of the slots defining pole pieces extending from the bore into a radially outer portion of the laminations, the improvement comprising a plurality of cooling air passages extending axially through the stacked laminations generally parallel to the central bore, each of said air passages being positioned substantially abutting the terminating end of a corresponding one of the winding slots, and each said air passage having a radially outer shape arcuately shaped with respect to an outer circumference of the laminations for minimizing effects of the air passages on electromagnetic flux in the laminations.

7. The improved cooling arrangement for a dynamoelectric machine as recited in claim 6 wherein each said cooling air passage extends circumferentially between a pair of radius lines of the machine co-extensive with opposite circumferential edges of a respective one of the winding slots.

8. The improved cooling arrangement of claim 7 wherein each said air passage has a crescent shape when viewed axially.

9. The improved cooling arrangement of claim 8 wherein each said air passage is positioned to minimize effects on electromagnetic flux lines in the stacked laminations.

10. A dynamoelectric machine comprising:

an outer housing;

a pair of end shields attached to opposite ends of said housing, each of said end shields having a plurality of air vents passing therethrough;

a stator assembly positioned in said housing generally axially spaced from said end shields and having a plurality of winding means adapted for excitation upon the energization of the dynamoelectric machine, said stator assembly comprising a plurality of stacked laminations having a plurality of axially aligned, circumferentially spaced, radially inner slots through which said winding means extend;

a plurality of crescent shaped air passages positioned adjacent a radially outer end of at least some of said slots; and means for forcing cooling air through said air passages for cooling said winding means.

11. The dynamoelectric machine of claim 10 wherein said stator assembly is assembled in heat exchange relationship with said outer housing, said air passages being positioned such that a major portion of the mass of said stacked laminations lies outside a cylinder defined by an outer periphery of said air passages.

12. The dynamoelectric machine of claim 10 wherein said winding means includes a pair of opposite end turns, formed to force a flow of cooling air radially outward of said air passages.

13. The dynamoelectric machine of claim 12 and further including a rotor assembly arranged in magnetic coupling relation with said stator assembly and adapted for rotation upon energization of the dynamoelectric machine, and blower means coupled to at least one end of said rotor assembly for forcing air over an adjacent one of said end turns and into said air passages.

14. The dynamoelectric machine of claim 10 wherein said stator assembly has an outer diameter of about 6.4 inches and the cross-sectional area of each of said air passages is about 0.0475 square inches.

* * * * *